US012284166B2

(12) United States Patent
Gupta et al.

(10) Patent No.: US 12,284,166 B2
(45) Date of Patent: *Apr. 22, 2025

(54) THROUGHPUT FOR A SINGLE VPN CONNECTION USING MULTIPLE PROCESSING CORES

(71) Applicant: MICROSOFT TECHNOLOGY LICENSING, LLC, Redmond, WA (US)

(72) Inventors: Abhishek Gupta, Redmond, WA (US); Shivakumar Thangapandi, Redmond, WA (US); Vikrant Arora, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/946,956

(22) Filed: Sep. 16, 2022

(65) Prior Publication Data

US 2023/0076070 A1 Mar. 9, 2023

Related U.S. Application Data

(63) Continuation of application No. 17/332,752, filed on May 27, 2021, now Pat. No. 11,477,176.

(51) Int. Cl.
*H04L 9/40* (2022.01)
(52) U.S. Cl.
CPC ...... *H04L 63/0485* (2013.01); *H04L 63/0272* (2013.01)

(58) Field of Classification Search
CPC . H04L 63/04; H04L 63/0485; H04L 63/0272; H04L 63/0428
See application file for complete search history.

(56) References Cited

U.S. PATENT DOCUMENTS

| 2013/0064198 A1 | 3/2013 | Krishnaswamy |
| 2013/0318345 A1 | 11/2013 | Hengeveld |

(Continued)

OTHER PUBLICATIONS

Non-Final Office Action mailed on Dec. 7, 2023, in U.S. Appl. No. 17/518,382, 29 pages.

(Continued)

*Primary Examiner* — Brian F Shaw
(74) *Attorney, Agent, or Firm* — Newport IP, LLC; Jacob P. Rohwer

(57) ABSTRACT

The techniques described herein increase the throughput of a single VPN connection by creating multiple outbound and/or inbound Security Associations (SAs). For instance, two or more different SAs can encrypt outbound data packets to be sent over the VPN connection to a remote device. Moreover, two or more different SAs can decrypt inbound data packets received over the VPN connection from the remote device. Each of the SAs can be bound to a different processing core via the use of a Security Parameter Index (SPI) identifier. Consequently, inbound data packets communicated over a single VPN connection from a remote device to a physical host in a VPN gateway can be distributed amongst multiple processing cores for decryption purposes. Further, outbound data packets to be communicated over the single VPN connection from the physical host to the remote device can be distributed amongst multiple processing cores for encryption purposes.

15 Claims, 7 Drawing Sheets

(56) References Cited

U.S. PATENT DOCUMENTS

2016/0020922 A1  1/2016  Sung
2019/0173851 A1* 6/2019  Jain .................... H04L 63/0485
2021/0021523 A1  1/2021  Wang et al.
2022/0385637 A1  12/2022 Thangapandi et al.

OTHER PUBLICATIONS

Final Office Action mailed on May 22, 2024, in U.S. Appl. No. 17/518,382, 32 pages.
Notice of Allowance mailed Sep. 23, 2024, in U.S. Appl. No. 17/518,382, 16 Pages.
Zaharuddin, et al., "Technical Comparison Analysis of Encryption Algorithm on Site-to-Site IPSec VPN", International Conference on Computer Applications and Industrial Electronic, Dec. 7, 2010, pp. 641-645.
Communication under Rule 71(3) Received for European Application No. 22725597.3, mailed on Feb. 19, 2025, 7 pages.
U.S. Appl. No. 17/332,752, filed May 27, 2021.

* cited by examiner

| | Security Association Table 200 | |
|---|---|---|
| 202 — Inbound SA 130 | SPI 130 (0x80808080) | Processing Core 124(3) |
| 204 — Inbound SA 132 | SPI 132 (0x60606060) | Processing Core 124(4) |
| 206 — Outbound SA 126 (Selector 210 – 0.0.0.0/1) | SPI 126 (0x90909090) | Processing Core 124(1) |
| 208 — Outbound SA 128 (Selector 212 – 128.0.0.0/1) | SPI 128 (0x70707070) | Processing Core 124(2) |

FIG. 2

THROUGHPUT FOR A SINGLE VPN CONNECTION USING MULTIPLE PROCESSING CORES

PRIORITY APPLICATION

The present application is a continuation of U.S. patent application Ser. No. 17/332,752 filed on May 27, 2021, entitled "IMPROVING THROUGHPUT FOR A SINGLE VPN CONNECTION USING MULTIPLE PROCESSING CORES", the content of which application is hereby expressly incorporated herein by reference in its entirety.

BACKGROUND

A virtual private network (VPN) implements various technologies that exchange data, typically Internet Protocol data, via another network so that users can remotely access network resources in a secure manner. In other words, these network resources may otherwise be inaccessible via public Internet. VPNs are frequently used in the information technology sector to provide secure access to resources for users that are not physically connected to an organization's network. In many situations, these users are telecommuting workers or employees.

Conventionally, a VPN client can access network resources via a VPN gateway. A VPN gateway is an intermediate system tasked with sending data traffic between the network resources and a remote location (e.g., a home network, an on-premises network, an enterprise network, etc.) over the public Internet. Consequently, the VPN client typically operates on a remote device or a remote gateway (e.g., an on-premises device, a home device, a work device, etc.) and the VPN gateway is configured by a service (e.g., cloud) provider in the network to enable secure access to the network resources (e.g., virtual networks, virtual machines, servers, etc.), which are configured behind the VPN gateway.

A VPN gateway typically consists of multiple VPN server instances. A VPN server instance is typically responsible for decrypting inbound data and passing the inbound data off to resources on the network side (e.g., applications executing via a virtual network and/or on a virtual machine). The VPN server instance may also encrypt outbound data and send the outbound data from the network resources to the VPN client.

VPNs are configured to use a security protocol, such as Internet Protocol Security (IPsec), to authenticate and encrypt/decrypt data packets so that communications between two VPN endpoints (e.g., VPN gateway and remote gateway) are secured over Internet Protocol (IP) networks. Many VPNs further use a protocol to negotiate parameters for the encryption and the decryption to be used for a VPN connection. In one example, this protocol is Internet Key Exchange Security Association (IKE-SA). A Security Association (SA) typically consists of a Security Parameter Index (SPI) identifier, an IP destination address, and a security protocol identifier (e.g., Authentication Header (AH) and Encapsulating Security Payload (ESP)).

When establishing a VPN connection, which may be referred to as a VPN "tunnel", an individual SA associates a single destination with an SPI identifier. Consequently, a single VPN connection typically includes two SAs, one SA for the data communicated from a network device (e.g., a server instance configured as part of a VPN gateway) to a destination IP address associated with a remote device, and a different SA for the data communicated from the remote device to a destination IP address associated with the network device.

Conventionally, data packets of a data flow are sent in a sequence, and for this reason, a single SA is bound to a single processing core of a virtual machine executing on a physical machine in the VPN gateway (e.g., a server instance). That is, the SA is used to send a sequence of data packets (e.g., inbound data packets or outbound data packets) to the same processing core to ensure the data packets are processed (e.g., encrypted or decrypted) in the correct order.

This restriction that limits a single VPN connection to two SAs can have a negative effect on the throughput over a VPN connection due to the highly intensive processing work that is needed for an IKE-SA, which is all focused on a single processing core. Consequently, this processing work can become a bottleneck for providing high throughput for the VPN connection. It is with respect to these and other considerations the disclosure made herein is presented.

SUMMARY

The techniques disclosed herein provide a virtual private network (VPN) gateway configured to create multiple outbound and/or inbound Security Associations (SAs) for a single VPN connection with a remote device, or remote gateway, executing a VPN client. For example, two or more different SAs can be configured to encrypt outbound data to be sent over the VPN connection to the remote device via a destination Internet Protocol (IP) subnet. Moreover, two or more different SAs can be configured to decrypt inbound data received over the VPN connection from the remote device. Each of the SAs can be associated with a different processing core via the use of a Security Parameter Index (SPI) identifier. Consequently, inbound data packets communicated over a single VPN connection from a remote device to a physical host (e.g., a server instance) in a VPN gateway can be distributed amongst multiple processing cores for decryption purposes. Further, outbound data packets to be communicated over the single VPN connection from the physical host in the VPN gateway to the remote device can be distributed amongst multiple processing cores for encryption purposes.

The VPN gateway is configured to determine a number of available processing cores to encrypt the outbound data packets and/or to decrypt the inbound data packets for a single VPN connection. In one example, the available processing cores can be allocated to a virtual machine executing on a physical host in the VPN gateway. A processing core may be available at a given time if it is not being used and/or if it is operating below a capacity level (e.g., threshold capacity) that is known to have a negative effect on throughput. Accordingly, a physical host in the VPN gateway can be configured to monitor the operating capacities of the processing cores in the physical hosts and use the monitored operating capacities to allocate available processing cores to a virtual machine tasked with encrypting and decrypting data packets for a VPN connection using Internet Protocol Security (IPsec).

The VPN gateway is configured to divide the number of available processing cores into a first set (e.g., two or more) of processing cores to encrypt the outbound data packets and a second set (e.g., two or more) of processing cores to decrypt the inbound data packets. This enables the encryption or decryption of directional traffic for the VPN connection to be split amongst multiple processing cores. The VPN gateway creates multiple outbound SAs for the VPN connection based on a number of processing cores in the first set. For instance, if there are two processing cores in the first set then the VPN gateway creates two outbound SAs. If there are three processing cores in the first set then the VPN gateway creates three outbound SAs. The VPN gateway also creates multiple inbound SAs for the VPN connection based on a number of processing cores in the second set. For instance, if there are two processing cores in the second set then the VPN gateway creates two inbound SAs. If there are three processing cores in the second set then the VPN gateway creates three inbound SAs. Accordingly, the number of SAs to be used for the inbound and the outbound data packets can be configurable and/or scaled based on availability and/or other factors. In one example, the VPN gateway decides to use all the available processing cores to encrypt and to decrypt data packets communicated over a single VPN connection. In other examples, a decision can be made to use less than all the available processing cores when considering other factors.

The VPN gateway is configured to assign an SPI identifier to each of the outbound SAs and to each of the inbound SAs, thereby creating multiple SA/SPI pairs. The SPI identifier is a value (e.g., a 32-bit value) that identifies an SA and differentiates the SA from other SAs. The VPN gateway assigns, or bounds, each SA/SPI pair to a processing core. Furthermore, the VPN gateway creates a security association table for the VPN connection. The assignments of the SA/SPI pairs to processing cores are reflected in the security association table so that they can be accessed and referenced when routing a data packet for processing. Stated alternatively, the security association table includes entries that map, for a single VPN connection, an individual SA/SPI pair to an identification of a bound processing core.

The VPN gateway must ensure that the appropriate routing decision is made for outbound data packets. As described above, outbound data packets to be communicated from network resources to the remote device over the VPN connection need to be encrypted. Part of this process includes adding an SPI identifier to the data packet, thereby transforming the data packet from a first type (e.g., TCP data packet, UDP data packet, ICMP data packet, etc.) to a more secure second type (e.g., an Encapsulating Security Payload (ESP) data packet). Consequently, when received by the VPN gateway, an outbound data packet does not yet have an SPI identifier. To ensure an outbound data packet is routed to the correct processing core, the VPN gateway is configured to assign a traffic selector to each of the outbound SAs. The traffic selector identifies a part of the destination IP subnet being used by the remote device, as well as a part of a source IP subnet. Accordingly, a traffic selector identifies mappings between source and destination IP subnets, and enables the selection of an outbound SA based on these mappings. For an individual source IP subnet or a part of a source IP subnet, the VPN gateway is configured to divide a destination IP subnet into multiple non-overlapping parts, or IP address ranges, and assign an individual part of the IP subnet to an individual outbound SA. These traffic selectors can be added to the security association table and used to balance the outbound load across the processing cores tasked with encrypting outbound data packets for the VPN connection.

An outbound data packet routed to the VPN gateway from a virtual machine executing in the network (e.g., the cloud) includes a header that identifies a destination IP address. This destination IP address is included in the destination IP subnet used by the remote device. When an outbound data packet is received at the VPN gateway, the VPN gateway selects an outbound SA for the outbound data packet based on the traffic selector. For instance, the VPN gateway associates the destination IP address in the header with a matching part of the destination IP subnet which has been assigned to a particular outbound SA using a traffic selector. This match enables the selection of an outbound SA for processing/encryption purposes. Once the appropriate outbound SA is selected, the VPN gateway accesses the security association table to identify a processing core that is bound to the selected outbound SA. The VPN gateway can then route the outbound data packet with SA information context to the identified processing core for encryption.

When an inbound data packet (e.g., an ESP data packet) arrives at the VPN gateway from the remote device for decryption, the VPN gateway matches the SPI identifier in a header of the inbound data packet with an SPI identifier in the security association table. This match selects an inbound SA. The VPN gateway then uses the security association table to identify a processing core that is bound to the selected inbound SA. The VPN gateway can then route the inbound data packet with SA information context to the identified processing core for decryption.

In various examples, a flow table can be created based on packet identifiers so that subsequent data packets in the same sequence, or same data flow, can be associated with the same SA and routed to the same processing core in the correct order. In this way, a lookup operation using the security association table only needs to occur when the first data packet in a sequence is received. This provides an optimization because a flow table enables more efficient lookup operations compared to the security association table.

The techniques disclosed herein provide a number of features that improve existing computing devices. For instance, computational efficiency and throughput for data communicated over a VPN connection is improved. Moreover, the likelihood that a processing core fails due to overuse is greatly reduced. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 illustrates an example security association table used by the VPN gateway to route a data packet to a processing core.

DETAILED DESCRIPTION

Described herein is a system that creates multiple outbound and/or inbound Security Associations (SAs) for a single VPN connection with a remote device (e.g., a remote gateway). For instance, two or more different SAs can be configured to encrypt outbound data to be sent over the VPN connection to the remote device via a destination Internet Protocol (IP) subnet. Moreover, two or more different SAs can be configured to decrypt inbound data received over the VPN connection from the remote device. Each of the SAs can be associated with a different processing core via the use of a Security Parameter Index (SPI) identifier. Consequently, inbound data packets communicated over a single VPN connection from a remote device to a physical host (e.g., a server instance) in a VPN gateway can be distributed amongst multiple processing cores for decryption purposes. Further, outbound data packets to be communicated over the single VPN connection from the physical host in the VPN gateway to the remote device can be distributed amongst multiple processing cores for encryption purposes.

Figure 1:
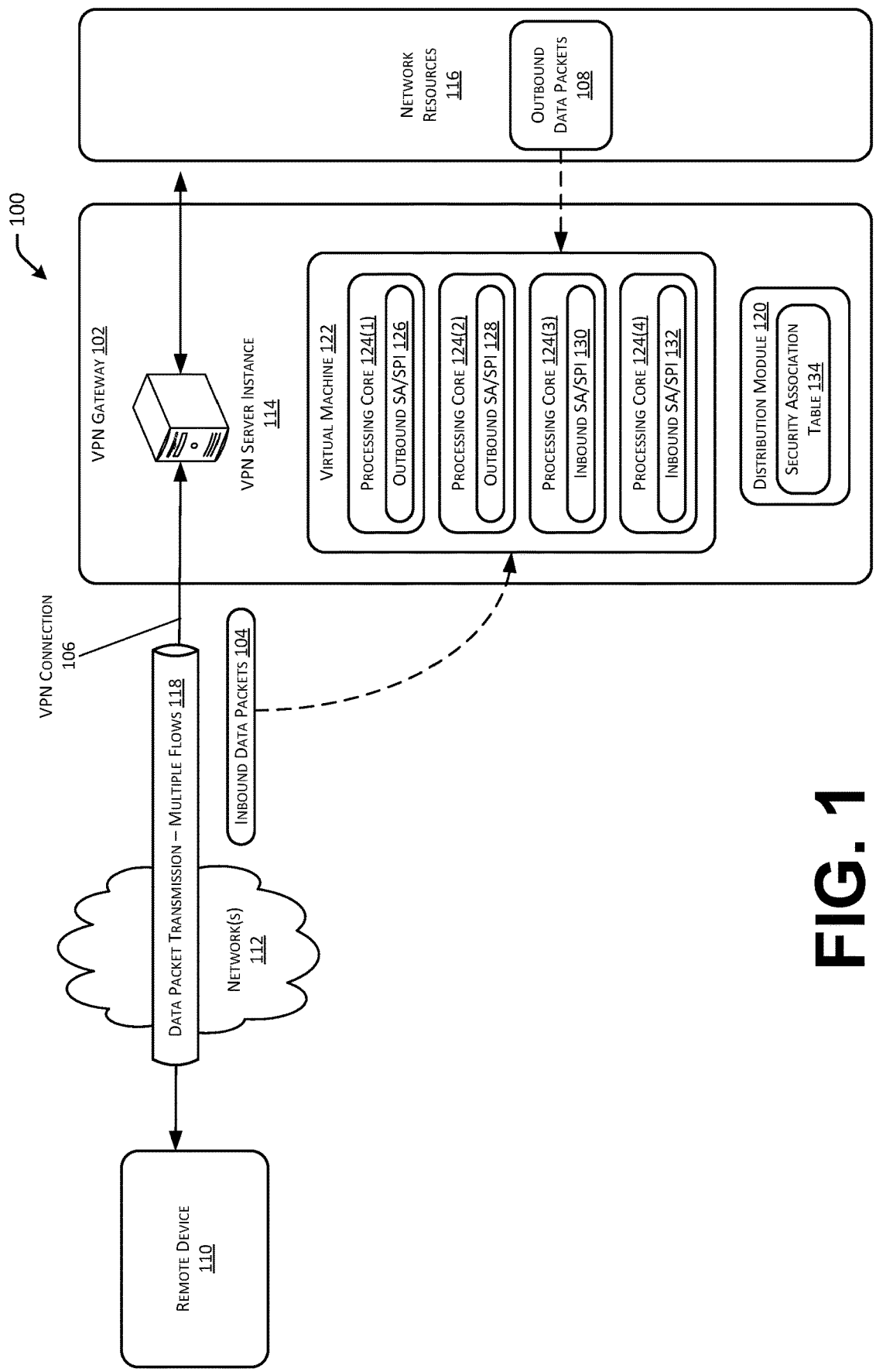
FIG. 1 illustrates an example environment in which a VPN gateway can distribute (i) inbound data packets from a single VPN connection across multiple processing cores and (ii) outbound data packets for the single VPN connection across multiple processing cores.

FIG. 1 illustrates an example environment 100 in which a VPN gateway 102 can distribute (i) inbound data packets 104 (e.g., ESP data packets) communicated over a single VPN connection 106 across multiple processing cores and (ii) outbound data packets 108 (e.g., TCP data packet, UDP data packet, ICMP data packet, etc.) to be communicated over the single VPN connection 106 across multiple processing cores. The VPN gateway 102 is configured to establish the VPN connection 106 with a remote device 110 over various network(s) 112.

The VPN gateway 102 includes a VPN server instance 114, also referred to as a physical "host" or "machine", that is part of a group of VPN server instances that are tasked with decrypting inbound data (e.g., inbound data packets 104) and passing the inbound data off to network resources 116 on the network side. In one example, these network resources 116 can include applications executing via a virtual network and/or on a virtual machine. The VPN server instances are also tasked with encrypting outbound data (e.g., outbound data packets 108), which originate in the network resources 116, and sending the outbound data to remote devices (e.g., remote device 110) over various VPN connections (e.g., VPN connection 106). The remote devices may then decrypt the outbound data packets and route the data packets to destinations within a remote network. Consequently, the VPN gateway 102 is an intermediate system tasked with securing and sending data traffic between network resources 116, configured behind the VPN gateway 102, and remote devices. Furthermore, a VPN connection 106 enables data packet transmission for multiple data flows 118 (e.g., data packets exchanged between two applications executing on two different endpoint devices). Consequently, the VPN connection 106 may alternatively be referred to as a VPN tunnel.

The VPN gateway 102 includes a distribution module 120 that is configured to allocate VPN gateway resources for encrypting and decrypting data communicated over the VPN connection 106. In one example, the distribution module 120 allocates a virtual machine 122 to the VPN connection 106. Further, the distribution module 120 is configured to determine a number of available processing cores to encrypt the outbound data packets and/or to decrypt the inbound data packets for a single VPN connection. A processing core may be available at a given time if it is not being used or if it is operating at a capacity level (e.g., 50%) below a threshold capacity level (e.g., 95%) that is known to have a negative effect on throughput. Accordingly, the distribution module 120 can be configured to monitor the operating capacities of the processing cores in the VPN server instance 114 and use the monitored operating capacities to allocate available processing cores to the virtual machine 122.

As shown in FIG. 1, the virtual machine 122 securing the data communications for the VPN connection 106 includes four available processing cores 124(1-4). While FIG. 1 illustrates that four processing cores are available, it is understood in the context of this disclosure, that more or less than four processing cores may be available. Typically, the processing cores allocated to the virtual machine 122 are all part of the same VPN server instance 114, but the number of processing cores allocated may not comprise all the processing cores of the VPN server instance 114 (e.g., multiple different virtual machines may be configured on the single VPN server instance 114).

The distribution module 120 is configured to divide the processing cores 124(1-4) into a first set (e.g., two or more) of processing cores 124(1), 124(2) to encrypt the outbound data packets 108 and a second set (e.g., two or more) of processing cores 124(3), 124(4) to decrypt the inbound data packets 104. This enables the encryption or decryption of directional traffic for the VPN connection 106 to be split amongst multiple processing cores, thereby improving the throughput. Consequently, a total number of available processing cores can be divided into two sets so that a number of processing cores for encryption and a number of processing cores for decryption can be determined. In some examples, the numbers for encryption and decryption are the same.

The distribution module 120 also creates multiple outbound SAs for the VPN connection 106 based on a number of processing cores in the first set and assigns an outbound SA to a processing core (e.g., binds an SA to a dedicated processing core). The distribution module 120 is configured to assign an SPI identifier to each of the outbound SAs. Accordingly, as shown in FIG. 1, processing core 124(1) is associated with a first outbound SA/SPI pair 126 and processing core 124(2) is associated with a second outbound SA/SPI pair 128.

Continuing this approach, the distribution module 120 creates multiple inbound SAs for the VPN connection 106 based on a number of processing cores in the second set and assigns an inbound SA to a processing core. The distribution module 120 is configured to assign an SPI identifier to each of the inbound SAs. Accordingly, as further shown in FIG. 1, processing core 124(3) is associated with a first inbound SA/SPI pair 130 and processing core 124(4) is associated with a second inbound SA/SPI pair 132.

The number of SAs and processing cores to be used for the inbound and the outbound data packets can be configurable and/or scaled based on the availability of processing cores and/or other factors. In one example, the VPN gateway 102 decides to use all the available processing cores in a virtual machine 122 to encrypt and to decrypt data packets communicated over a single VPN connection 106. In other examples, a decision can be made to use less than all the available processing cores when considering other factors.

Now each available processing core 124(1-4) to be used for encryption and decryption is associated with an SA and an SPI identifier. The SPI identifier is a value (e.g., a 32-bit value) that identifies an SA and differentiates the SA from other SAs. These associations are reflected in different entries of a security association table 134 created by the distribution module 120 on behalf of the virtual machine 122 and the VPN connection 106. The security association table 134 maps SA/SPI pairs to their dedicated processing cores, and these mappings can be referenced via the security association table 134 when routing a data packet for processing.

FIG. 2 illustrates an example security association table 200 (e.g., security association table 134) used by the distribution module 120 of the VPN gateway 102 to route a data packet to a processing core. The security association table 200 includes a first entry 202 that maps the first inbound SA 130 and its SPI identifier 130 (from FIG. 1) to processing core 124(3). The SPI identifier 130 in this first entry 202 is "0x80808080". The security association table 200 includes a second entry 204 that maps the second inbound SA 132 and its SPI identifier 132 (from FIG. 1) to processing core 124(4). The SPI identifier 132 in this second entry 204 is "0x60606060". The security association table 200 includes a third entry 206 that maps the first outbound SA 126 and its SPI identifier 126 to processing core 124(1). The SPI identifier 126 in this third entry 206 is "0x90909090". Finally, the security association table 200 includes a fourth entry 208 that maps the second outbound SA 128 and its SPI identifier 128 to processing core 124(2). The SPI identifier 128 in this third entry 206 is "0x70707070".

The distribution module 120 must ensure that the appropriate routing decision, for encryption purposes, is made for outbound data packets. As described above, outbound data packets are ones that originate in the network resources 116 and ones that need to be encrypted when received by the VPN gateway 102. Part of this encryption process includes adding an SPI identifier (e.g., "0x90909090" or "0x70707070") to the outbound data packet before it is communicated over the VPN connection 106. Consequently, when received by the VPN gateway 102, an outbound data packet 108 is a type that does not yet have an SPI identifier (e.g., a TCP data packet, a UDP data packet, an ICMP data packet).

To ensure an outbound data packet 108 is routed to the correct processing core, the distribution module 120 is configured to assign a traffic selector to each of the outbound SAs 126, 128. The traffic selector identifies a part of the destination IP subnet being used by the remote device 110, as well as a source IP subnet or part of a source IP subnet being used by the network resources 116. Accordingly, a traffic selector identifies mappings between source and destination IP subnets, and enables the selection of an outbound SA based on these mappings. For an individual source IP subnet or a part of a source IP subnet, the distribution module 120 is configured to divide a destination IP subnet into multiple non-overlapping parts, or IP address ranges, and assign an individual part of the destination IP subnet to an individual outbound SA. These traffic selectors are added to the security association table 200 and used to balance the outbound load across the processing cores 124(1), 124(2) tasked with encrypting outbound data packets for the VPN connection 106. In various examples, the traffic selectors create equal size parts (e.g., the same number of IP addresses to be included in each part).

As shown in FIG. 2, if the destination IP subnet for the remote device 110 is "0.0.0.0", the distribution module 120 can assign a first traffic selector 210 to the first outbound SA 126 (e.g., the part of the destination IP subnet covered by "0.0.0.0/1"). Similarly, the distribution module 120 can assign a second traffic selector 212 to the second outbound SA 128 (e.g., the part of the destination IP subnet covered by "128.0.0.0/1"). The traffic selectors 210, 212 divide the destination IP subnet into two parts, and these parts are mapped to same source IP address(es) (e.g., used by the network resources 116 that generate the outbound data packets).

Figure 3:
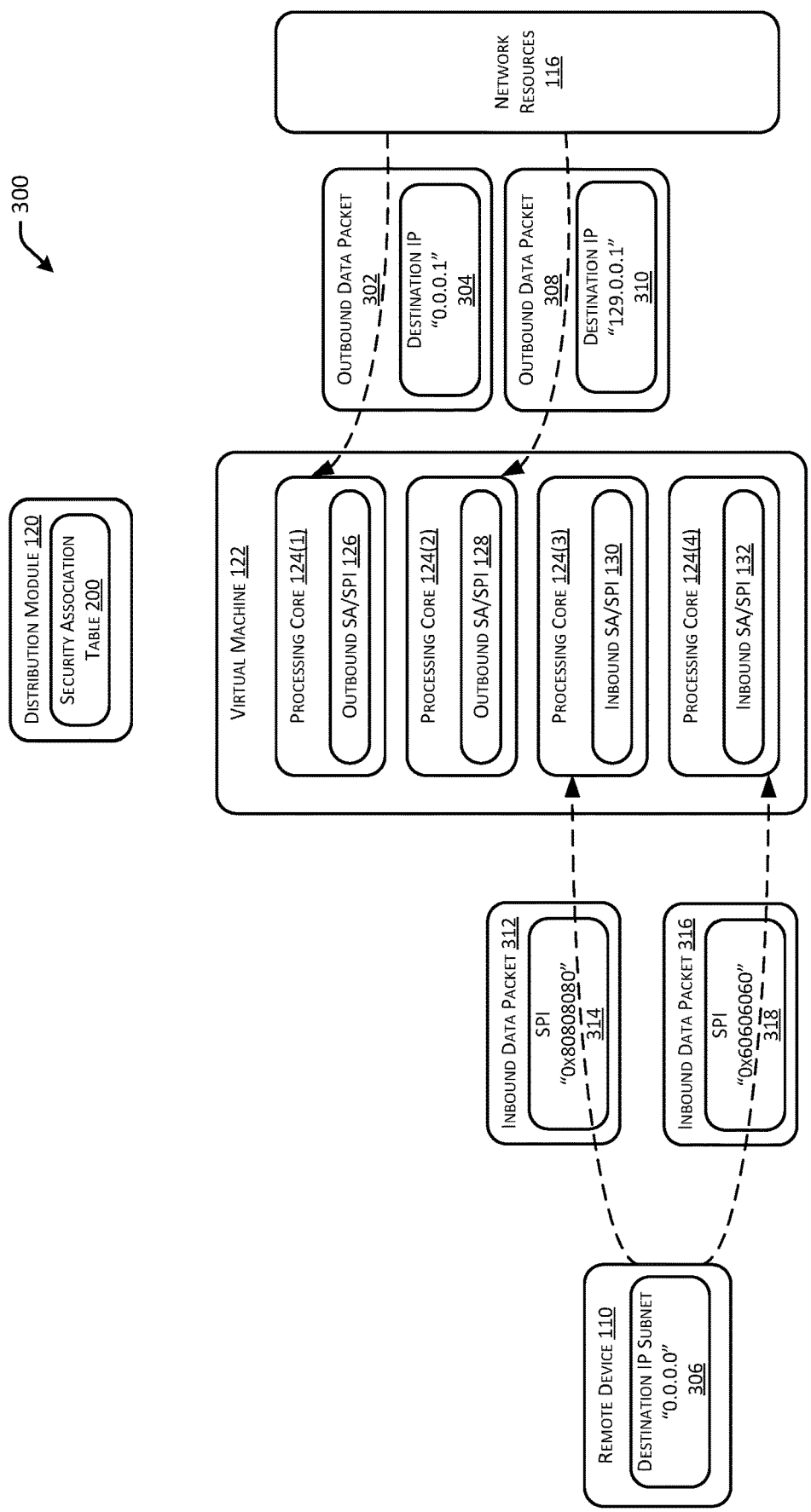
FIG. 3 illustrates an example environment in which a data packet is routed by the VPN gateway using a security association table.

FIG. 3 illustrates an example environment 300 in which a data packet is routed by the VPN gateway 102 (e.g., the distribution module 120) using the security association table 200 from FIG. 2. When the network resources 116 route an outbound data packet to the VPN gateway 102, a header that specifies a destination IP address is included. As shown in FIG. 3, a first outbound data packet 302 includes a header that specifies a destination IP address 304 of "0.0.0.1". The distribution module 120 is configured to obtain this destination IP address 304 of "0.0.0.1" from the outbound data packet 302 and select outbound SA 126 by associating, or matching, the destination IP address 304 of "0.0.0.1" with a corresponding part (e.g., "0.0.0.0/1") of the destination IP subnet 306 (e.g., "0.0.0.0") of the remote device 110. This part (e.g., "0.0.0.0/1") of the destination IP subnet 306 is identified via the traffic selector 210 assigned to outbound SA 126.

Similarly, FIG. 3 illustrates a second outbound data packet 308 that includes a header that specifies a destination IP address 310 of "129.0.0.1". The distribution module 120 is configured to obtain this destination IP address 310 of "129.0.0.1" from the outbound data packet 308 and select outbound SA 128 by associating, or matching, the destination IP address 310 of "129.0.0.1" with a corresponding part (e.g., "128.0.0.1") of the destination IP subnet 306 (e.g., "0.0.0.0") of the remote device 110. This part (e.g., "128.0.0.1") of the destination IP subnet 306 is identified via the traffic selector 212 assigned to outbound SA 128. Consequently, the traffic selectors 210, 212 enable efficient selection of outbound SAs (e.g., may be referred to as quick mode (QM) SAs) for a single VPN connection 106.

Using the security association table 200, the distribution module 120 can identify the processing cores that are bound to the selected outbound SAs. That is, as shown in FIG. 3, the distribution module 120 routes outbound data packet 302 to processing core 124(1) based on the selected outbound SA 126 and routes outbound data packet 308 to processing core 124(2) based on the selected outbound SA 128. As described above, these processing cores 124(1) and 124(2) encrypt the outbound data packets 302, 308, to be communicated to the remote device 110 over the same VPN connection 106, in accordance with IPsec. Accordingly, the SPI identifier "0x90909090" is added to outbound data packet 302 and the SPI identifier "0x70707070" is added to outbound data packet 308. In other words, the outbound data packets are transformed from one type of data packet to a more secure type of data packet (e.g., an ESP data packet).

When an inbound data packet arrives at the VPN gateway 102 from the remote device 110 for decryption, the inbound data packet includes a header (e.g., an ESP header) that specifies an SPI identifier based on the encryption that occurs via a VPN client operating on the remote device 110. As shown in FIG. 3, inbound data packet 312 includes a header with SPI 314 "0x80808080" and inbound data packet 316 includes a header with SPI 318 "0x60606060". Accordingly, the distribution module 120 is configured to match the SPI identifiers in the header of the inbound data packets 312, 316 with an SPI identifier in the security association table 200. More specifically, the distribution module 120 matches SPI 314 "0x80808080" with entry 202 in the security association table 200 to select the first inbound SA 130 for the inbound data packet 312. Similarly, the distribution module 120 matches SPI 318 "0x60606060" with entry 204 in the security association table 200 to select the second inbound SA 132 for the inbound data packet 316.

The distribution module 120 can then use the security association table 200 to identify the processing cores that are bound to the selected inbound SAs. That is, as shown in FIG. 3, the distribution module 120 routes inbound data packet 312 to processing core 124(3) based on the selected inbound SA 130 and routes inbound data packet 316 to processing core 124(4) based on the selected inbound SA 132. As described above, these processing cores 124(3) and 124(4) decrypt the inbound data packets 312, 316 in accordance with IPsec and pass them on to the network resources 116. Consequently, these routings include SA context information for decryption purposes.

In various examples, the distribution module 120 can create and cache a flow table based on packet identifiers so that subsequent data packets in the same sequence, or same data flow (e.g., same destination and source IP addresses/ports), can be associated with the same SA and routed to the same processing core in the correct order. In this way, a lookup operation using the security association table 200 only needs to occur when the first data packet in a sequence is received (e.g., the initial outbound data packet is sent from network resources 116 to the remote device 110). Subsequent data packets can be correctly routed to a processing cores using the cached flow table. This provides an optimization because a flow table enables more efficient lookup operations compared to the security association table.

The techniques described above improve the throughput of a VPN connection. Moreover, the techniques can be implemented to make a runtime load balancing decision when a particular processing core is over utilized when compared to other available processing cores. For instance, a decision can be made to create additional SAs when additional processing cores are available for use. In this way, data traffic can be distributed across more processing cores.

Figure 4:
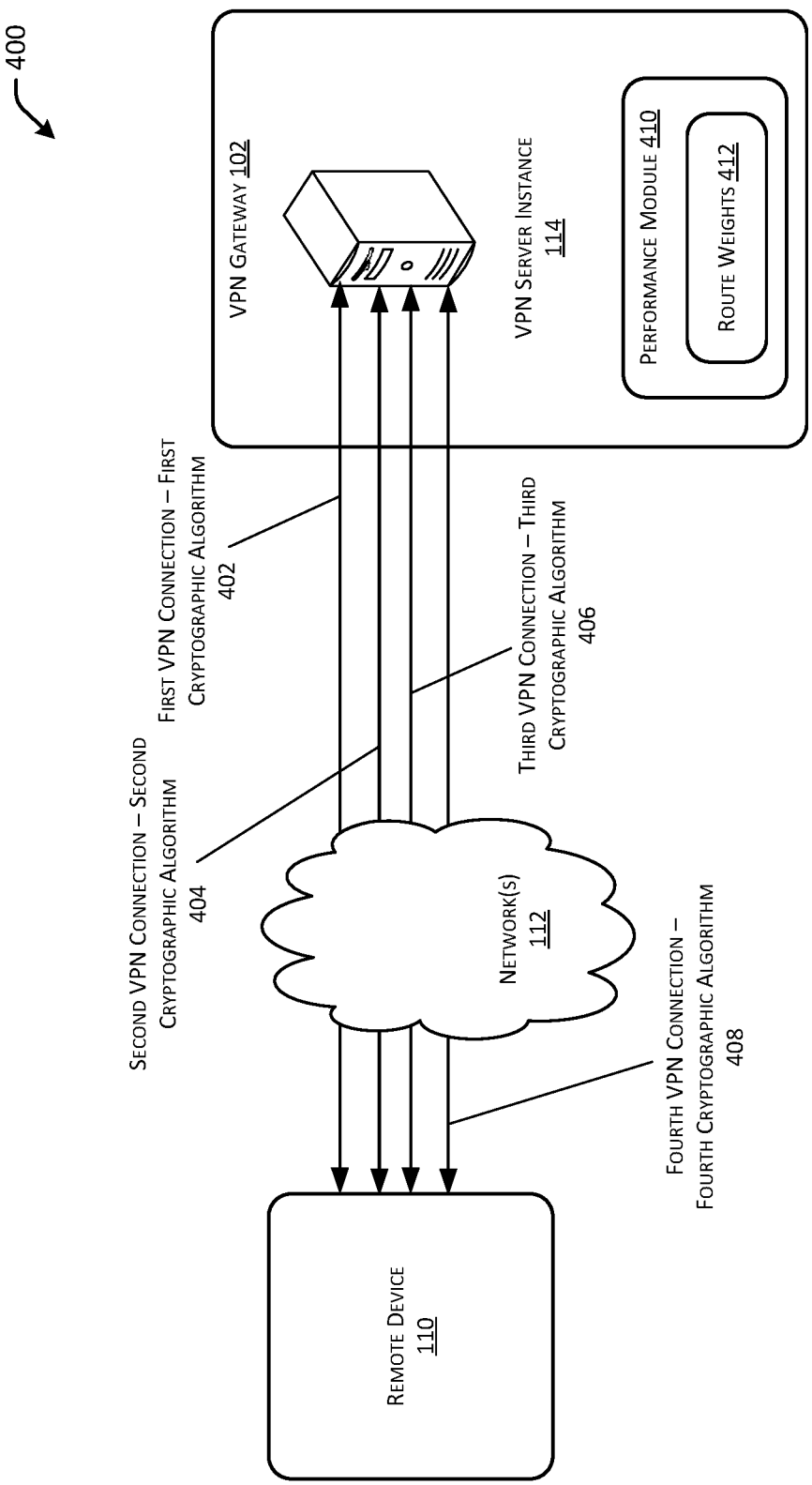
FIG. 4 illustrates an example environment in which a VPN gateway can improve throughput by selecting a VPN connection based on route weights determined in accordance with cryptographic algorithms.

FIG. 4 illustrates an example environment 400 in which the VPN gateway 102 can further improve throughput by selecting a VPN connection based on route weights determined in accordance with cryptographic algorithms. The VPN gateway 102 can be configured to establish multiple VPN connections 402, 404, 406, 408 with various endpoints of a remote device. While the number of VPN connections in this example is four, it is understood the that more or less than four VPN connections can be established between the remote device 110 and the VPN gateway 102.

These VPN connections 402, 404, 406, 408 are configured to negotiate the use of different cryptographic algorithms. As shown in FIG. 4, VPN connection 402 uses a first cryptographic algorithm, VPN connection 404 uses a second cryptographic algorithm, VPN connection 406 uses a third cryptographic algorithm, and VPN connection 408 uses a fourth cryptographic algorithm. These different cryptographic algorithms provide different levels of security, but they also have different performance requirements.

The VPN gateway 102 can include a performance module 410 configured to monitor the performance of the data transmission on the VPN connections 402, 404, 406,408. More specifically, the performance module 410 can determine when the performance parameters indicate that the VPN connections are performing similarly with respect to performance metrics (e.g., latency), or when the VPN connection are performing different with respect to performance metrics.

To further increase throughput, the performance module 410 can establish route weights 412 based on the different cryptographic algorithms negotiated for the different VPN connections 402, 404, 406, 408. These route weights 412 can be used to help make routing decisions based on security and performance of cryptographic algorithms. Stated alternatively, the route weights 412 can be used to select, for a data flow, a VPN connection 402 with a highly performant cryptographic algorithm over other VPN connections 404, 406, 408 that use less performant cryptographic algorithms.

Figure 5:
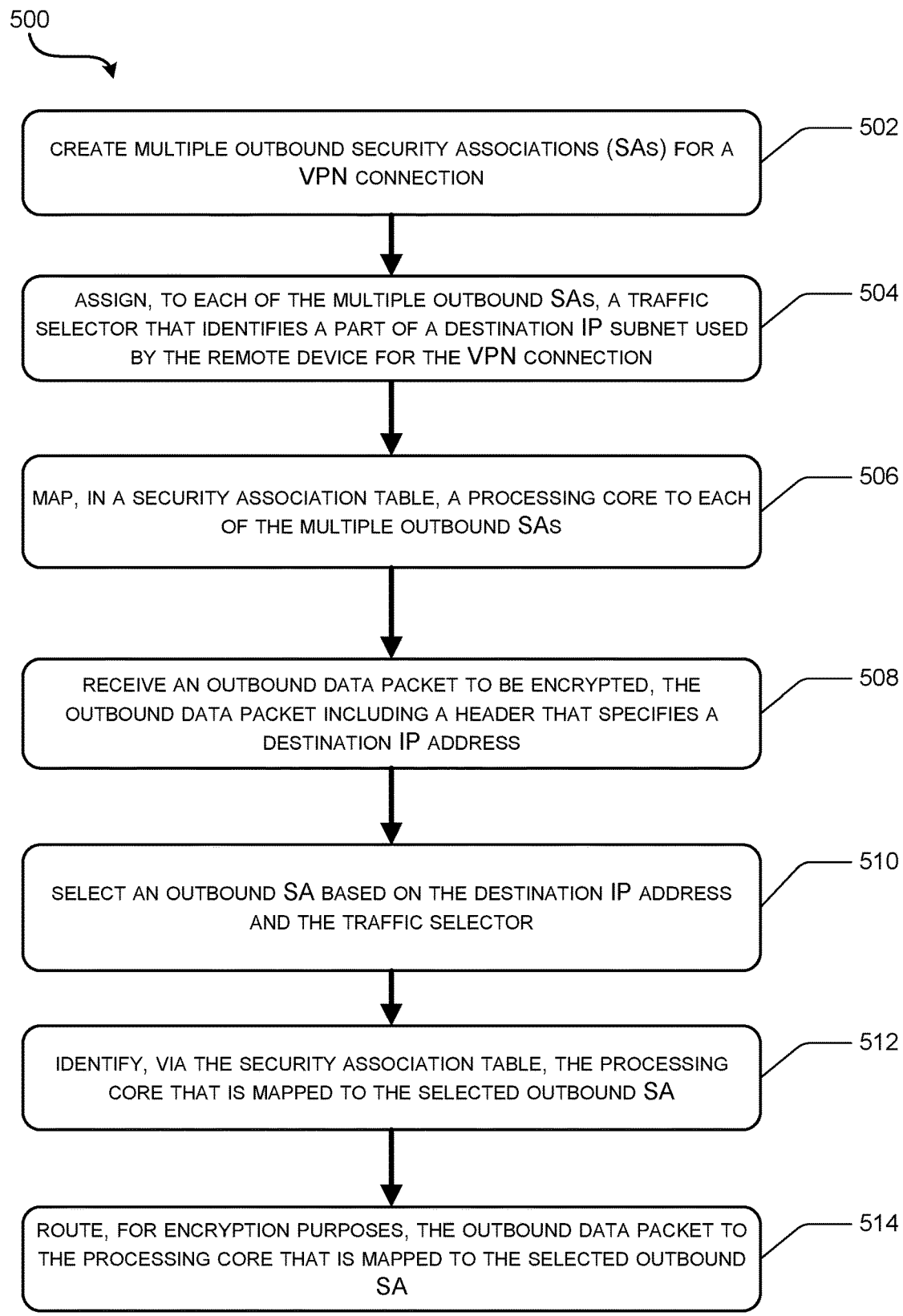
FIG. 5 is a flow diagram illustrating aspects of a sample routine that routes an outbound data packet to one of multiple processing cores.
Figure 6:
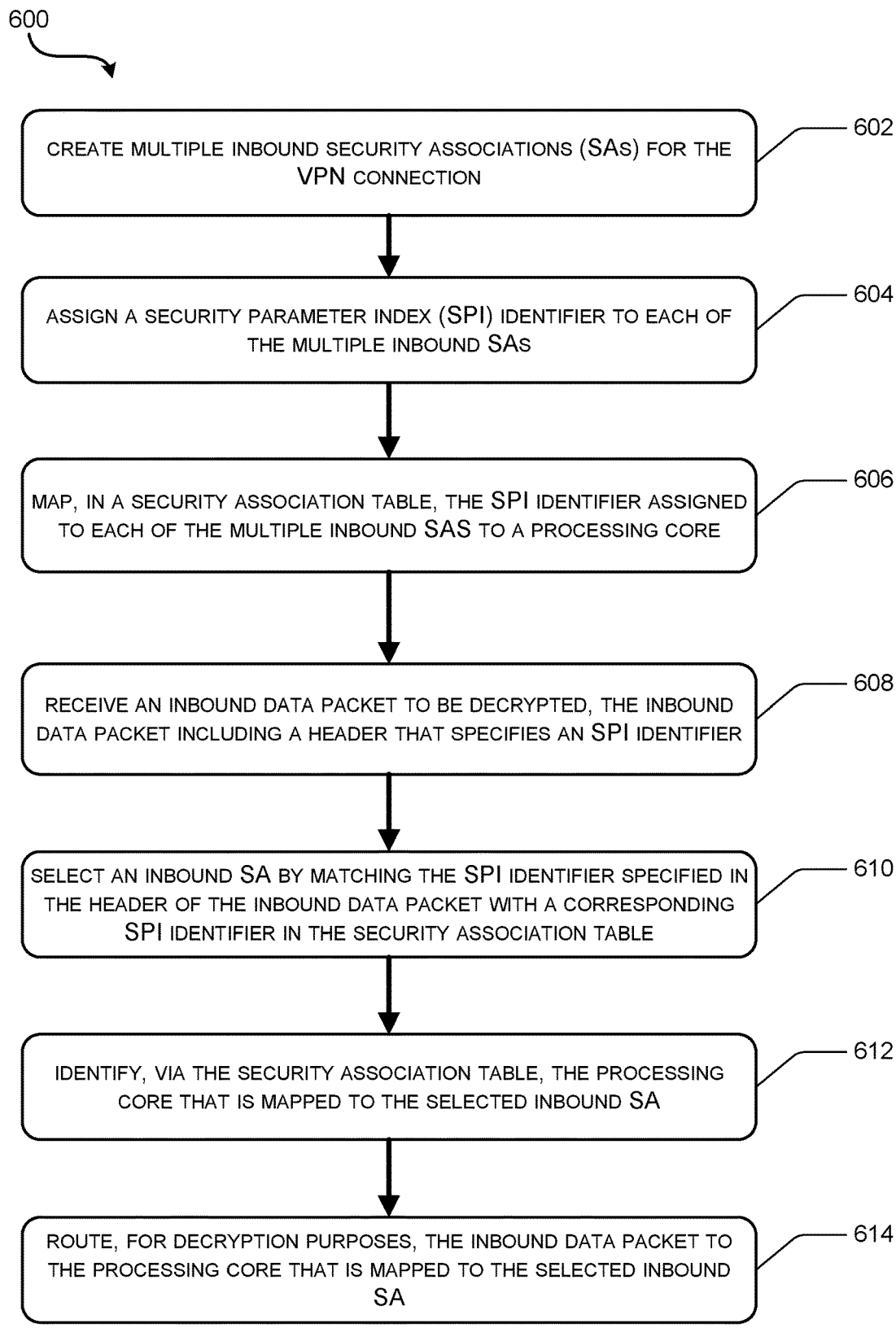
FIG. 6 is a flow diagram illustrating aspects of a sample routine that routes an inbound data packet to one of multiple processing cores.

FIGS. 5 and 6 are flow diagrams illustrating routines describing aspects of the present disclosure. In various examples, operations of the routines can be performed by components of the VPN gateway (e.g., the server instance, the distribution module configured on a server of the VPN gateway, etc.). The logical operations described herein with regards to FIGS. 5 and 6 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routines can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routines may be also implemented in many other ways. For example, the routines may be implemented, at least in part, by another remote computer, processor, or circuit. In the examples described herein, one or more modules of a computing system can receive and/or process the data. Any service, circuit, or application suitable for providing the techniques disclosed herein can be used in the operations described.

With reference to FIG. 5, the routine 500 begins at operation 502 where multiple outbound security associations (SAs) are created for a VPN connection. At operation 504, a traffic selector is assigned to each of the multiple outbound SAs. The traffic selector identifies a part of a destination IP subnet used by a remote device for the VPN connection and maps the part of the destination IP subnet to a source IP subnet or part of a source IP subnet.

At operation 506, a processing core is mapped, in a security association table, to each of the multiple outbound SAs. As described above, the security association table may be created when the VPN connection is established. At operation 508, an outbound data packet to be encrypted is received. As described above, the outbound data packet includes a header that specifies a destination IP address.

At operation 510, an outbound SA is selected based on the destination IP address and a traffic selector. That is, the VPN gateway is configured to match the destination IP address specified in the header of the outbound data packet with a corresponding part of the destination IP subnet identified via the traffic selector assigned to the selected outbound SA. The security association table may be used to find this match.

At operation 512, the security association table is used to identify the processing core that is mapped to the selected outbound SA. Finally, at operation 514, the outbound data packet is routed to the processing core that is mapped to the selected outbound SA, so that the outbound data packet can be encrypted.

With reference to FIG. 6, the routine 600 begins at operation 602 where multiple inbound security associations (SAs) are created for a VPN connection. At operation 604, a security parameter index (SPI) identifier is assigned to each of the multiple inbound SAs. At operation 606, the SPI identifier assigned to each of the multiple inbound SAs is mapped, in a security association table, to a processing core.

At operation 608, an inbound data packet to be decrypted is received. As described above, the inbound data packet includes a header that specifies an SPI identifier. At operation 610, an inbound SA is selected by matching the SPI identifier specified in the header of the inbound data packet with a corresponding SPI identifier in the security association table.

At operation 612, the processing core that is mapped to the selected inbound SA is identified using the security association table. Finally, at operation 614, the inbound data packet is routed to the processing core that is mapped to the selected inbound SA, so that the inbound data packet can be decrypted.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 7:
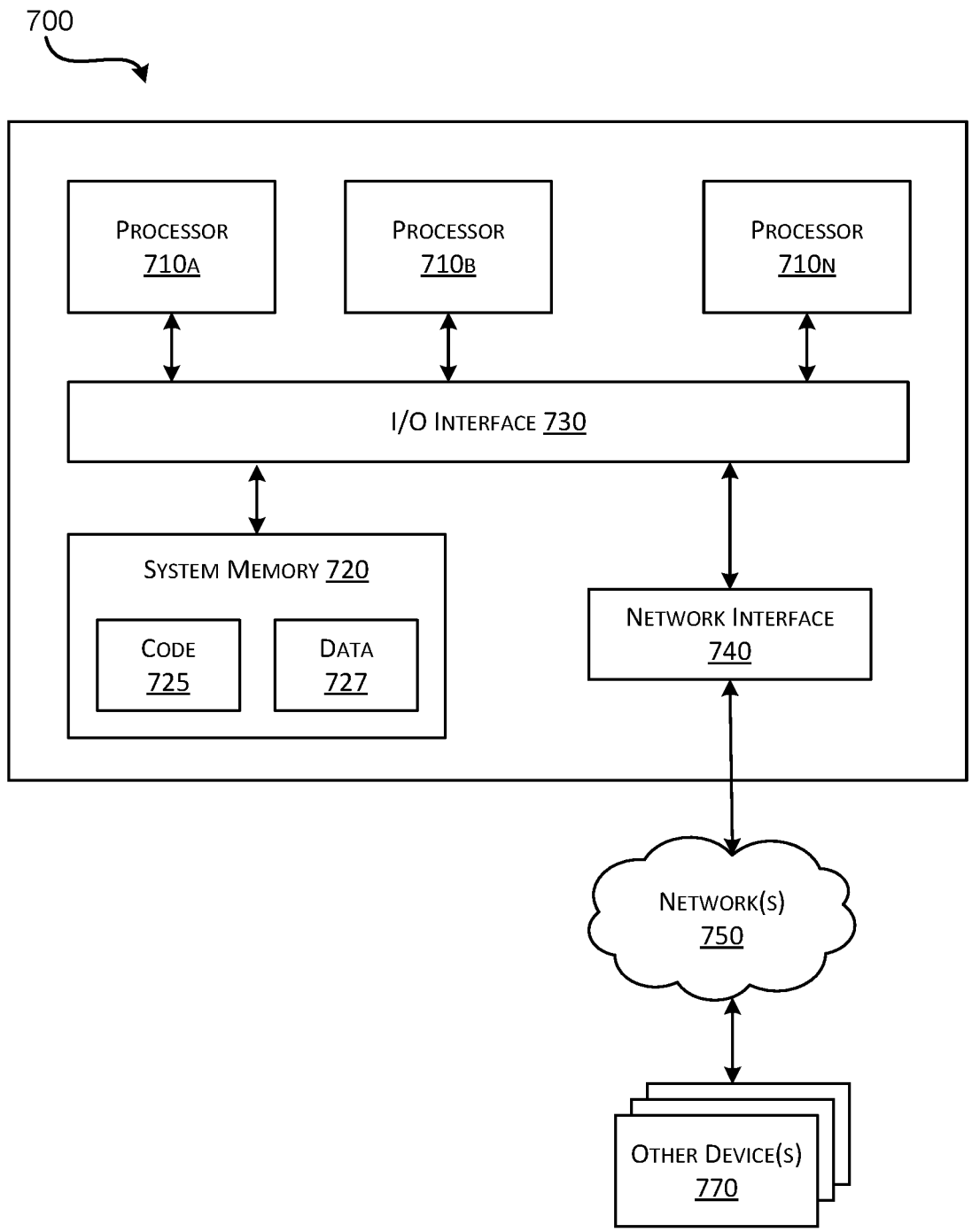
FIG. 7 is an example computing system capable of implementing the techniques of the present disclosure.

FIG. 7 illustrates a general-purpose computing device 700. In various examples, device 700 can be a server computer or any other sort of computing device that can serve as a physical host or other sort of computing device in the VPN gateway. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to the I/O interface 730. In various embodiments, the processors 710 can be the processing cores described above.

In various embodiments, computing device 700 may be a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 720 as code 725 and data 727.

In one embodiment, the I/O interface 730 may be configured to coordinate I/O traffic between the processor 710, system memory 720, and any peripheral devices in the device, including network interface 740 or other peripheral interfaces. In some embodiments, the I/O interface 730 may perform any necessary protocol, timing, or other data transformations to convert data signals from one component (e.g., system memory 720) into a format suitable for use by another component (e.g., processor 710). In some embodiments, the I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of the I/O interface 730, such as an interface to system memory 720, may be incorporated directly into processor 710.

Network interface 740 may be configured to allow data to be exchanged between computing device 700 and other device or devices 770 attached to a network or network(s) 750, such as other computer systems or components illustrated in FIGS. 1 through 4, for example. In various embodiments, network interface 740 may support communication via any suitable wired or wireless general data networks. Additionally, network interface 740 may support communication via telecommunications/telephony networks such as analog voice networks or digital fiber communications networks, via storage area networks such as Fibre Channel SANs or via any other suitable type of network and/or protocol.

Network(s) 750 (e.g., networks 112) may include, for example, public networks such as the Internet, private networks such as an institutional and/or personal intranet, or some combination of private and public networks. Network(s) 750 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 750 may utilize communications protocols, including packet-based and/or datagram-based protocols such as Internet protocol ("IP"), transmission control protocol ("TCP"), user datagram protocol ("UDP"), or other types of protocols. Moreover, network(s) 750 may also include a number of devices that facilitate network communications and/or form a hardware basis for the networks, such as switches, routers, gateways, access points, firewalls, base stations, repeaters, backbone devices, and the like.

In some embodiments, system memory 720 may be one embodiment of a computer-accessible medium configured to store program instructions and data as described above for FIGS. 1-6. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740.

Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses.

Example Clause A, a method of encrypting and decrypting data packets using Internet Protocol Security (IPsec), comprising: determining a number of available processing cores to encrypt outbound data packets being communicated to a remote device over a virtual private network (VPN) connection and to decrypt inbound data packets that are received from the remote device over the VPN connection; dividing the number of available processing cores into a first set of processing cores to encrypt the outbound data packets and a second set of processing cores to decrypt the inbound data packets; creating multiple outbound security associations (SAs) for the VPN connection, wherein a number of the multiple outbound SAs corresponds to a number of processing cores in the first set; assigning, to each of the multiple outbound SAs, a traffic selector that identifies a part of a destination Internet Protocol (IP) subnet used by the remote device for the VPN connection; creating multiple inbound SAs for the VPN connection, wherein a number of the multiple inbound SAs corresponds to a number of processing cores in the second set; assigning a security parameter index (SPI) identifier to each of the multiple outbound SAs and to each of the multiple inbound SAs thereby creating multiple SA/SPI pairs; creating a security association table that includes individual entries that map an individual SA/SPI pair to an identification of a processing core; for an outbound data packet to be encrypted: selecting an outbound SA for the outbound data packet based on the part of the destination IP subnet identified via the traffic selector assigned to the outbound SA and the destination IP address specified in the header of the outbound data packet; using the security association table to identify a first processing core that is mapped to the selected outbound SA; and routing the outbound data packet to the first processing core for encryption; for an inbound data packet to be decrypted: selecting an inbound SA by matching an SPI identifier in a header of the inbound data packet with a corresponding SPI identifier in the security association table; using the security association table to identify a second processing core that is mapped to the selected inbound SA; and routing the inbound data packet to the second processing core for decryption.

Example Clause B, the method of Example Clause A, wherein the number of available processing cores are allocated by a VPN gateway to a virtual machine to implement the encrypting and the decrypting of the data packets using IPsec.

Example Clause C, the method of Example Clause A or Example Clause B, wherein encrypting the outbound data packet comprises adding the SPI identifier associated with the selected outbound SA to the header of the outbound data packet.

Example Clause D, the method of any one of Example Clauses A through C, wherein the parts of the destination IP subnet used by the remote device for the VPN connection, which are assigned to the multiple outbound SAs, are of equal size.

Example Clause E, the method of any one of Example Clauses A through D, wherein the security association table is created when the VPN connection is established.

Example Clause F, a system for encrypting outbound data packets to be communicated over a virtual private network (VPN) connection from a VPN gateway to a remote device, the system comprising: one or more processors; and computer storage media having executable instructions that, when executed by the one or more processors, cause the system to perform operations comprising: creating multiple outbound security associations (SAs) for the VPN connection; assigning, to each of the multiple outbound SAs, a traffic selector that identifies a part of a destination IP subnet used by the remote device for the VPN connection; mapping, in a security association table, a processing core to each of the multiple outbound SAs; receiving an outbound data packet to be encrypted, wherein the outbound data packet includes a header that specifies a destination Internet Protocol (IP) address; selecting an outbound SA for the outbound data packet based on the part of the destination IP subnet identified via the traffic selector assigned to the outbound SA and the destination IP address specified in the header of the outbound data packet; identifying, via the security association table, the processing core that is mapped to the selected outbound SA; and routing, for encryption purposes, the outbound data packet to the processing core that is mapped to the selected outbound SA.

Example Clause G, the system of Example Clause F, wherein selecting the outbound SA for the outbound data packet comprises determining that the destination IP address specified in the header of the outbound data packet is included in the part of the destination IP subnet assigned to the selected outbound SA via the traffic selector.

Example Clause H, the system of Example Clause F or Example Clause G, wherein the operations further comprise determining a number of available processing cores to encrypt the outbound data packets.

Example Clause I, the system of Example Clause H, wherein the number of available processing cores to encrypt the outbound data packets is half of a total number of available processing cores, wherein the other half of the total number of available processing cores are for decrypting inbound data packets communicated over the VPN connection.

Example Clause J, the system of Example Clause H or Example Clause I, wherein the number of available processing cores are allocated by the VPN gateway to a virtual machine to implement the encrypting of the outbound data packets using Internet Protocol Security (IPsec).

Example Clause K, the system of any one of Example Clauses H through J, wherein an individual processing core is determined to be available if the individual processing core is operating at a capacity that is less than a threshold capacity.

Example Clause L, the system of any one of Example Clauses F through K, wherein encrypting the outbound data packet comprises adding a security parameter index (SPI) identifier associated with the selected outbound SA to the header of the outbound data packet.

Example Clause M, the system of any one of Example Clauses F through L, wherein the parts of the destination IP subnet used by the remote device for the VPN connection, which are assigned to the multiple outbound SAs, are of equal size.

Example Clause N, the system of any one of Example Clauses F through M, wherein the outbound data packet is a first outbound data packet communicated in a data flow and the operations further comprise creating and caching a flow table so that subsequent outbound data packets in the same data flow can be routed to the processing core that is mapped to the selected outbound SA without having to perform a lookup operation in the security association table.

Example Clause O, a system for decrypting inbound data packets communicated over a virtual private network (VPN) connection from a remote device to a VPN gateway, the system comprising: one or more processors; and computer storage media having executable instructions that, when executed by the one or more processors, cause the system to perform operations comprising: creating multiple inbound security associations (SAs) for the VPN connection; assigning a security parameter index (SPI) identifier to each of the multiple inbound SAs; mapping, in a security association table, the SPI identifier assigned to each of the multiple inbound SA to a processing core; receiving an inbound data packet to be decrypted, wherein the inbound data packet includes a header that specifies an SPI identifier; selecting an inbound SA by matching the SPI identifier specified in the header of the inbound data packet with a corresponding SPI identifier in the security association table; identifying, via the security association table, the processing core that is mapped to the selected inbound SA; and routing, for decryption purposes, the inbound data packet to the processing core that is mapped to the selected inbound SA.

Example Clause P, the system of Example Clause O, wherein the operations further comprise determining a number of available processing cores to decrypt the inbound data packets.

Example Clause Q, the system of Example Clause P, wherein the number of available processing cores to decrypt the inbound data packets is half of a total number of available processing cores, wherein the other half of the total number of available processing cores are for encrypting outbound data packets to be communicated over the VPN connection.

Example Clause R, the system of Example Clause P or Example Clause Q, wherein the number of available processing cores are allocated by the VPN gateway to a virtual machine to implement the decrypting of the inbound data packets using Internet Protocol Security (IPsec).

Example Clause S, the system of any one of Example Clauses P through R, wherein an individual processing core is determined to be available if the individual processing core is operating at a capacity that is less than a threshold capacity.

Example Clause T, the system of any one of Example Clauses O through S, wherein the security association table includes entries that map outbound SAs to additional processing cores so that outbound data packets can be encrypted for communication over the VPN connection.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different SAs, two different processing cores, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for encrypting outbound data packets to be communicated over a single virtual private network (VPN) tunnel from a VPN gateway to a remote device, the system comprising:
   one or more processors; and
   computer storage media having executable instructions that, when executed by the one or more processors, cause the system to perform operations comprising:
      determining a number of available processing cores to encrypt the outbound data packets being communicated to the remote device over the single VPN tunnel and to decrypt inbound data packets that are received from the remote device over the single VPN tunnel, wherein an individual processing core comprises an available processing core based on a determination that the individual processing core is operating at a capacity that is less than a threshold capacity;
      responsive to determining the number of available processing cores, dividing the number of available processing cores into a first set of processing cores to encrypt the outbound data packets and a second set of processing cores to decrypt the inbound data packets;
      creating multiple outbound security associations (SAs) for the single VPN tunnel;

associating a different processing core, in the first set of processing cores, with each of the multiple outbound SAs created for the single VPN tunnel;

receiving an outbound data packet to be encrypted, wherein the outbound data packet includes a header that specifies a destination Internet Protocol (IP) address;

selecting an outbound SA, from the multiple outbound SAs, for the outbound data packet based on the destination IP address specified in the header of the outbound data packet; and routing, for encryption purposes, the outbound data packet to the processing core that is associated with the selected outbound SA.

2. The system of claim 1, wherein the operations further comprise assigning, to each of the multiple outbound SAs, a part of a destination IP subnet used by the remote device for the single VPN tunnel, wherein selecting the outbound SA for the outbound data packet comprises determining that the destination IP address specified in the header of the outbound data packet is included in the part of the destination IP subnet assigned to the selected outbound SA.

3. The system of claim 1, wherein each of the first set of processing cores and the second set of processing cores is half of the number of available processing cores.

4. The system of claim 1, wherein the number of available processing cores are allocated by the VPN gateway to a virtual machine to implement at least one of the encrypting of the outbound data packets or the decrypting of the inbound data packets using Internet Protocol Security (IPsec).

5. The system of claim 1, wherein encrypting the outbound data packet comprises adding a security parameter index (SPI) identifier associated with the selected outbound SA to the header of the outbound data packet.

6. The system of claim 1, wherein the outbound data packet is a first outbound data packet communicated in a data flow and the operations further comprise creating and caching a flow table so that subsequent outbound data packets in the same data flow can be routed to the processing core that is associated with the selected outbound SA.

7. A system for decrypting inbound data packets communicated over a single virtual private network (VPN) tunnel from a remote device to a VPN gateway, the system comprising:

one or more processors; and computer storage media having executable instructions that, when executed by the one or more processors, cause the system to perform operations comprising:

determining a number of available processing cores to encrypt outbound data packets being communicated to the remote device over the single VPN tunnel and to decrypt the inbound data packets that are received from the remote device over the single VPN tunnel, wherein an individual processing core comprises an available processing core based on a determination that the individual processing core is operating at a capacity that is less than a threshold capacity;

responsive to determining the number of available processing cores, dividing the number of available processing cores into a first set of processing cores to encrypt the outbound data packets and a second set of processing cores to decrypt the inbound data packets;

creating multiple inbound security associations (SAs) for the single VPN tunnel;

assigning an identifier to each of the multiple inbound SAs created for the single VPN tunnel;

associating the identifier assigned to each of the multiple inbound SAs with a different processing core in the second set of processing cores;

receiving an inbound data packet to be decrypted, wherein the inbound data packet includes a header that specifies an identifier;

selecting an inbound SA, from the multiple inbound SAs, by matching the identifier specified in the header of the inbound data packet with the identifier assigned to the selected inbound SA; and routing, for decryption purposes, the inbound data packet to the processing core that is associated with the selected inbound SA.

8. The system of claim 7, wherein each of the first set of processing cores and the second set of processing cores is half of the number of available processing cores.

9. The system of claim 7, wherein the number of available processing cores are allocated by the VPN gateway to a virtual machine to implement at least one of the encrypting of the outbound data packets or the decrypting of the inbound data packets using Internet Protocol Security (IPsec).

10. A method for encrypting outbound data packets to be communicated over a single virtual private network (VPN) tunnel from a VPN gateway to a remote device, the method comprising:

determining a number of available processing cores to encrypt the outbound data packets being communicated to the remote device over the single VPN tunnel and to decrypt inbound data packets that are received from the remote device over the single VPN tunnel, wherein an individual processing core comprises an available processing core based on a determination that the individual processing core is operating at a capacity that is less than a threshold capacity;

responsive to determining the number of available processing cores, dividing the number of available processing cores into a first set of processing cores to encrypt the outbound data packets and a second set of processing cores to decrypt the inbound data packets;

creating multiple outbound security associations (SAs) for the single VPN tunnel;

associating a different processing core, of the first set of processing cores, with each of the multiple outbound SAs created for the single VPN tunnel;

receiving an outbound data packet to be encrypted, wherein the outbound data packet includes a header that specifies a destination Internet Protocol (IP) address;

selecting an outbound SA, from the multiple outbound SAs, for the outbound data packet based on the destination IP address specified in the header of the outbound data packet; and routing, for encryption purposes, the outbound data packet to the processing core that is associated with the selected outbound SA.

11. The method of claim 10, further comprising assigning, to each of the multiple outbound SAs, a part of a destination IP subnet used by the remote device for the single VPN tunnel, wherein selecting the outbound SA for the outbound data packet comprises determining that the destination IP address specified in the header of the outbound data packet is included in the part of the destination IP subnet assigned to the selected outbound SA.

12. The method of claim 10, wherein each of the first set of processing cores and the second set of processing cores is half of the number of available processing cores.

13. The method of claim 10, wherein the number of available processing cores are allocated by the VPN gateway to a virtual machine to implement at least one of the encrypting of the outbound data packets or the decrypting of the inbound data packets using Internet Protocol Security (IPsec).

14. The method of claim 10, wherein the outbound data packet is a first outbound data packet communicated in a data flow and the method further comprises creating and caching a flow table so that subsequent outbound data packets in the same data flow can be routed to the processing core that is associated with the selected outbound SA.

15. The method of claim 10, wherein encrypting the outbound data packet comprises adding a security parameter index (SPI) identifier associated with the selected outbound SA to the header of the outbound data packet.

* * * * *